Sept. 16, 1924.

J. I. LLOYD 1,508,663

SPRAYING MACHINE

Filed June 23, 1922

INVENTOR
JOHN. I. LLOYD.

BY Fetherstonhaugh & Co.
ATTYS.

Sept. 16, 1924.

J. I. LLOYD 1,508,663

SPRAYING MACHINE

Filed June 23, 1922

INVENTOR
JOHN. I. LLOYD.

BY Fetherstonhaugh & Co.
ATT'YS.

Patented Sept. 16, 1924.

1,508,663

UNITED STATES PATENT OFFICE.

JOHN INGLIS LLOYD, OF KENTVILLE, NOVA SCOTIA, CANADA.

SPRAYING MACHINE.

Application filed June 23, 1922. Serial No. 570,371.

*To all whom it may concern:*

Be it known that I, JOHN INGLIS LLOYD, a subject of the King of Great Britain, and resident of the town of Kentville, in the Province of Nova Scotia, Dominion of Canada, have invented certain new and useful Improvements in Spraying Machines, of which the following is a specification.

This invention relates to spraying machines, and has for its objects to provide an improved machine designed to be used in order to spray a pulverized poisonous substance required to be sprayed on the leaves of plants and in orchards in order to destroy the bugs and various insects eating out the leaves of the several plants.

Further objects are to provide an improved spraying machine, which comprises a hopper designed to contain the pulverized substance, to provide a conveying means within the hopper to feed the substance into the feed chamber, to provide a blower connected to the feed chamber.

Further objects are to provide means of propelling the blower fan in order to attract the poisonous substance from the feed chamber and spray it through a suitable nozzle.

Further objects are to provide a means of further pulverizing the poisonous substance as it is fed by the spiral conveyor into the feed chamber, to provide means of regulating the feed of poisonous substance into the feed chamber.

Still further objects are to provide an improved spraying machine, which is simple in construction, not liable to go out of repair, and generally to adapt the several parts to better perform the functions required of them.

With the above and other objects in view, the invention consists essentially of the improved construction, hereinafter described in detail in the accompanying specification and drawings.

In the drawings.

Like characters of reference indicate corresponding parts in all the figures.

Figure 1:
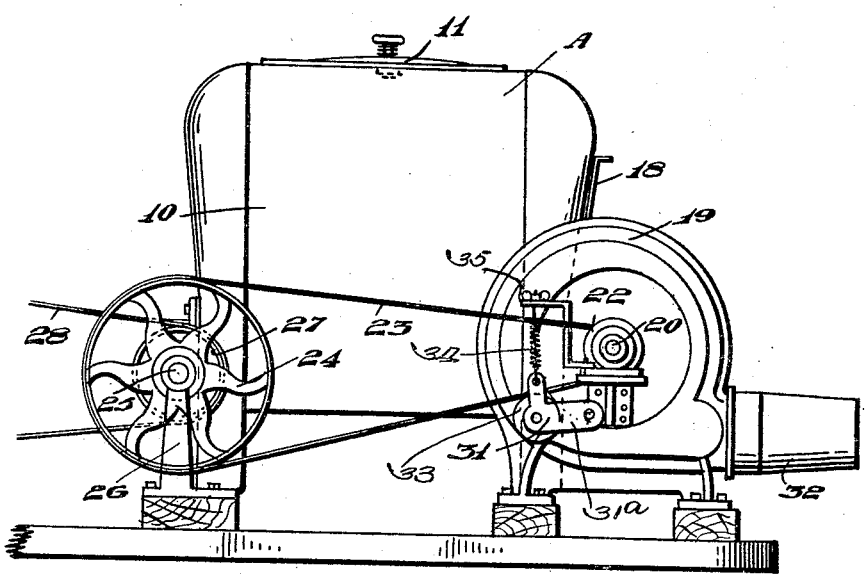
Figure 1 is a side elevation of the improved spraying machine.
Figure 2:
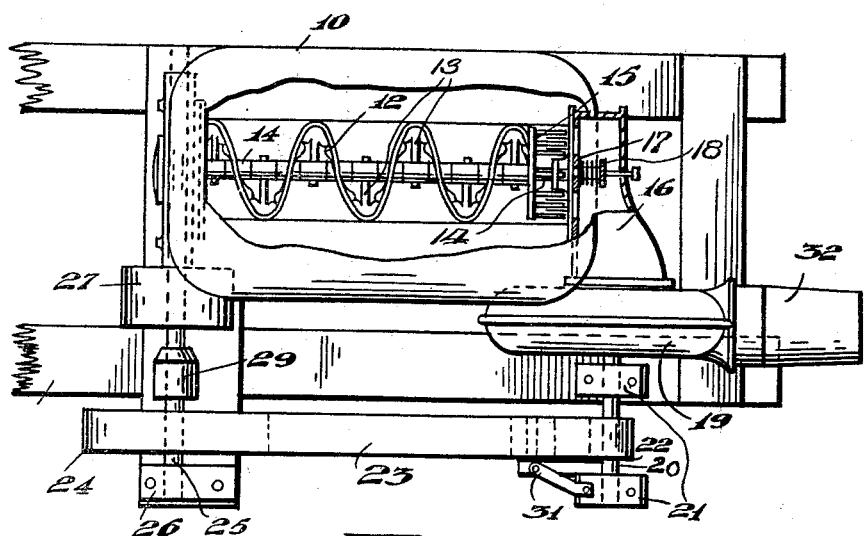
Figure 2 is a plan view of the same, part of the hopper being broken away.
Figure 8:
Figure 8 is a front elevation of one of these sections.
Figure 7:
Figure 7 is a plan view of one of the sections used in the spiral conveyor.
Figure 5:
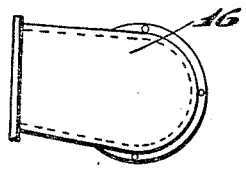
Figure 5 is an end elevation of the feed chamber.
Figure 6:
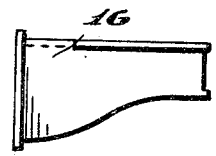
Figure 6 is a plan view of the same.

Referring to the drawings, A represents the spraying machine comprising a hopper 10 provided with a suitable closing lid 11. The hopper houses on its bottom a spiral conveyor 12, which comprises a plurality of anchor-shaped sections 13 journalled on a shaft 14.

Any number of these sections may be used in order to form a conveyor. Thirteen of them are used in the type of machine shown in the drawings, and this is the preferred number as it has proved efficient in use.

The shaft 14 carries on its end a pulverizing member 15 designed to further pulverize the poisonous dust as it is fed by the spiral conveyor 12 to the end of the hopper into a feed chamber 16.

The passage between the feed chamber 16 and the hopper 10 consists of a plurality of radiating openings in the lower wall of the hopper adjacent the pulverizing member 15, and in order to control the feed of poisonous substance from the hopper into the feed chamber 16, a perforated disc 17 is provided, which is mounted on the outer end of the shaft 14 and is designed to be operated by means of a lever 18.

By means of the operation of the lever 18, the orifices of the perforated disc 17 are brought around to register with the orifices provided in the wall of the hopper, when the feeding capacity will be at its maximum. If it is desired to lessen the quantity of poisonous substance fed into the feed chamber, the lever 18 is actuated in order to rotate the disc 17 and partly close the openings in the hopper wall.

The feed chamber 16 is connected to a blower 19 in which a fan is mounted on a transverse shaft 20 suitably journalled in bearings 21. The shaft 21 is connected by means of a pulley 22 and belt 23 to a pulley 24 journalled on a shaft 25 mounted on suitable bearings 26 at the rear end of the hopper 10.

Loosely mounted on the shaft 25 is a pulley 27 connected by a suitable belt 28 to the power shaft not shown in the drawings. The driving connection between the pulley 27 and the shaft 25 is made by means of a clutch 29 which is preferably a friction clutch as shown in the drawings.

Figure 3:
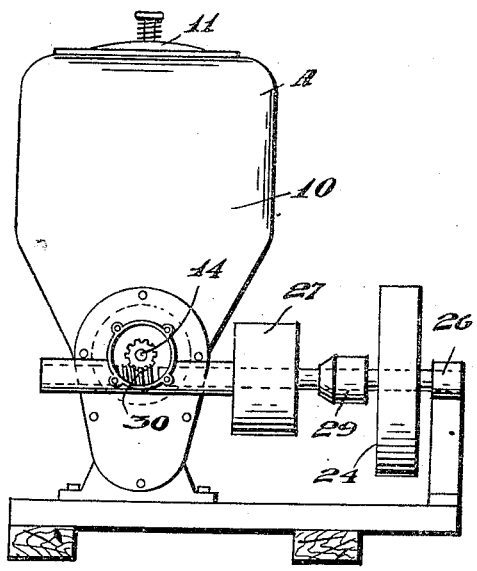
Figure 3 is a rear end elevation.
Figure 4:
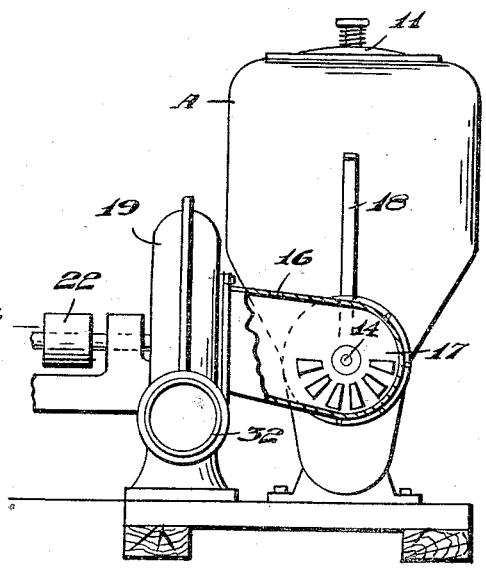
Figure 4 is a front end elevation.

The shaft 25 is connected to the conveyor shaft 14 by means of a worm and gear arrangement 30 shown in Figure 3 of the drawings. A suitable belt tightener 31 is also provided, the same being carried by one of the bearings 21 and designed to operate on the belt 23.

When this spraying machine is being used, a suitable quantity of the poisonous dust is placed into the hopper 10, which is then suitably closed by the lid 11. A driving connection is then made between the machine and the power shaft through a clutch member 29 on the vertical shaft 25 adapted to be moved upwardly into engagement with the pulley 27 which in turn operates through the belt 23 the pulley 22. To discontinue this driving connection between the pulley and the drive shaft, the clutch member 29 is shifted out of engagement with the pulley 27.

On the rotation of the shaft 25, motion is transmitted through the pulley 24, belt 23 and the pulley 22 to the fan shaft 20, and at the same time the shaft 25 through the worm and gear arrangement 30 transmits motion to the conveyor shaft 14.

The anchor shaped element 13 on the shaft 14 being in spiral arrangement on the shaft, will feed the poisonous dust into one end of the hopper where it will be further pulverized by the rotary member 15, and fed through the disc 17 into the feed chamber 16.

The disc 17 may be arranged by the operation of the lever 18 into a suitable position in order to allow the desired quantity of pulverized poisonous substance into the feed chamber.

The motion of the fan, which is an exhaust fan, will attract the pulverized substance from the feed chamber 16 into the blower 19 and then eject it through the spraying nozzle 32. The speed of the fan shaft 20 may be suitably regulated through the belt tightener 31, which is positioned to coact with the belt 23 and comprising a pivotally mounted bracket member 31ª carrying a roller 33 adapted to contact with a belt 23; the roller supporting bracket 31ª being connected at its other end by tension spring means 34 with the fixedly mounted bracket 35.

It is obvious that a hose could be connected to the nozzle 32 in order to direct the jet into any direction into the orchard or onto the leaves of the plants.

As many changes could be made in the above construction, and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

What I claim as my invention is:

1. A power dusting machine comprising, in combination, a hopper, a horizontally arranged shaft within the hopper, conveyor means on said shaft, a pulverizing member adjacent one end of said shaft adapted to pulverize the material fed by said conveyor means, a feed chamber, a communicating passage between the feed chamber and the hopper comprising a plurality of radiating openings in the wall of the hopper adjacent said pulverizing member, and means for controlling the supply of material from the hopper to the feed chamber, a perforated disc member on the outer end of said shaft, and lever means for operating said disc whereby the orifices therein are designed to register with the orifices in the hopper wall, blower means for the feed chamber, a fan for the blower, and means for driving the fan and the conveyor shaft.

2. In a dusting machine of the character described, the combination with a hopper having conveyor means therein, of a feed chamber communicating with said hopper, and pulverizing means between the conveyor means and the feed chamber, and means for operating the conveyor and the pulverizing means, and feed controlling means for the feed chamber, blower means for the feed chamber, and means for operating the feed control means, and means connected to the source of power for operating the blower means.

In witness whereof I have hereunto set my hand in the presence of two witnesses.

JOHN INGLIS LLOYD.

Witnesses:
JAMES S. ILSLEY,
MABELLE G. SMITH.